(12) United States Patent
Shin et al.

(10) Patent No.: US 11,067,127 B2
(45) Date of Patent: Jul. 20, 2021

(54) BEARING WHOSE LOAD SUPPORTING POSITION CAN BE CHANGED

(71) Applicant: HANWHA POWERSYSTEMS CO., LTD, Changwon-si (KR)

(72) Inventors: Seung Hoon Shin, Changwon-si (KR); Won Kyum Kim, Changwon-si (KR)

(73) Assignee: HANWHA POWERSYSTEMS CO., LTD, Changwon-si (KR)

( * ) Notice: Subject to any disclaimer, the term of this patent is extended or adjusted under 35 U.S.C. 154(b) by 0 days.

(21) Appl. No.: 16/730,146

(22) Filed: Dec. 30, 2019

(65) Prior Publication Data
US 2020/0291998 A1    Sep. 17, 2020

(30) Foreign Application Priority Data
Mar. 12, 2019    (KR) .................. 10-2019-0028127

(51) Int. Cl.
| | | |
|---|---|---|
| *F16C 35/02* | (2006.01) | |
| *F16C 17/03* | (2006.01) | |
| *F16C 25/02* | (2006.01) | |
| *F16C 33/52* | (2006.01) | |
| *F16C 17/06* | (2006.01) | |

(52) U.S. Cl.
CPC ............ *F16C 33/523* (2013.01); *F16C 17/03* (2013.01); *F16C 17/065* (2013.01); *F16C 25/02* (2013.01); *F16C 35/02* (2013.01); *F16C 2226/62* (2013.01)

(58) Field of Classification Search
CPC .......... F16C 35/02; F16C 25/02; F16C 25/06; F16C 2226/62; F16C 23/02; F16C 23/06; F16C 17/03; F16C 17/035; F16C 17/24; F16C 17/246; F16C 33/08; F16C 2226/60; F16C 35/06; F16C 35/067; F16C 35/077
See application file for complete search history.

(56) References Cited

U.S. PATENT DOCUMENTS

| | | | | |
|---|---|---|---|---|
| 434,480 | A | * | 8/1890 | Simonds .................. F16C 25/06 384/461 |
| 434,481 | A | * | 8/1890 | Simonds .................. F16C 25/06 384/538 |
| 577,689 | A | * | 2/1897 | Lobee ...................... F16C 23/06 384/519 |
| 1,649,258 | A | * | 11/1927 | Rummins ............... F16C 25/02 384/427 |
| 3,823,991 | A | * | 7/1974 | Lamperski .......... F16C 33/4664 384/309 |

(Continued)

*Primary Examiner* — Alan B Waits
(74) *Attorney, Agent, or Firm* — Sughrue Mion, PLLC

(57) ABSTRACT

A bearing of which a load supporting position capable of being changed, including: a cylindrical housing comprising a hollow inner circumferential surface; one or more support members provided in the housing and disposed along a circumferential direction of the inner circumferential surface; a plurality of pin holes provided along an outer circumferential surface of the housing; and a rotation preventing pin coupled to a first pin hole of the plurality of pin holes and configured to prevent rotation of the housing. In addition, threads are formed on inner circumferential surfaces of the pin holes and an outer circumferential surface of the rotation preventing pin to enable a pin hole and the rotation preventing pin to be easily coupled and decoupled.

12 Claims, 11 Drawing Sheets

(56) References Cited

U.S. PATENT DOCUMENTS

| | | | | |
|---|---|---|---|---|
| 4,365,849 | A | * | 12/1982 | Halloran ................. F16C 17/02 384/263 |
| 5,482,380 | A | * | 1/1996 | Corratti .................. F16C 17/03 384/311 |
| 5,489,156 | A | * | 2/1996 | Martinie ............... F16C 33/586 384/538 |
| 7,275,872 | B2 | * | 10/2007 | Abrahamian ........... F16C 17/03 384/255 |
| 8,322,928 | B2 | * | 12/2012 | Larsen .................... F16C 33/60 384/129 |
| 2017/0175808 | A1 | * | 6/2017 | Pruitt ...................... F02B 33/40 |
| 2017/0321753 | A1 | * | 11/2017 | Gillengerten ......... F16C 35/067 |

\* cited by examiner

BEARING WHOSE LOAD SUPPORTING POSITION CAN BE CHANGED

CROSS-REFERENCE TO THE RELATED APPLICATION

This non-provisional application claims priority from Korean Patent Application No. 10-2019-0028127 filed on Mar. 12, 2019 in the Korean Intellectual Property Office, the disclosure of which is incorporated herein by reference in its entirety.

BACKGROUND

1. Field

Apparatuses consistent with exemplary embodiments relate to a bearing where a load supporting position of the bearing can be changed, and more particularly, to a bearing which has a plurality of pin holes and in which a load supporting position on an inner circumferential surface of the bearing can be changed by changing the position of a rotation preventing pin coupled to any one of the pin holes.

2. Description of the Related Art

A bearing is a device that supports the load of a shaft in a turbo device including a rotor such as a compressor, a pump or a turbine and facilitates the rotary motion of the rotor by minimizing its friction with the shaft while the shaft rotates.

An inner circumferential surface of the bearing and an outer circumferential surface of the shaft may be in contact with each other or disposed in proximity to each other. Here, the bearing should be fixed at a predetermined position in order to support the load of the shaft despite its relative motion with respect to the shaft rotating at high speed.

FIG. 1A is a perspective view illustrating a state where a rotor having a bearing 10 is mounted in a gearbox 20 in the related art. FIG. 1B is an enlarged view of a pin slot 21 in which a rotation preventing pin 13 is placed in the related art.

Referring to FIGS. 1A and 1B, the rotor of a turbo device includes a pinion gear 30 which receives rotary power from a bull gear, a shaft 50 which is connected to the pinion gear 30 and rotates together with the pinion gear 30, and an impeller 40 which is coupled to an end of the shaft 50 and rotates together with the shaft 50. The bull gear and the pinion gear 30 are installed inside the gearbox 20 or a casing, and a hole through which the shaft 50 can pass is formed in the gearbox 20.

Here, the bearing 10 coupled to the shaft 50 between the pinion gear 30 and the impeller 40 is installed in the hole formed in the gearbox 20. That is, the bearing 10 is provided in the gearbox 20. The bearing 10 prevents the shaft 50 rotating at a high speed from contacting the gearbox 20 and supports the load of the shaft 50. Further, the bearing 10 facilitates the rotation of the shaft 50 by minimizing a frictional force between the shaft 50 and the bearing 10, albeit in a different way depending on whether the bearing 10 is a sliding bearing or a rolling bearing.

The gearbox 20 is divided into an upper part and a lower part. Thus, after a gear device is installed in, for example, the lower part of the gearbox 20, the upper part of the gearbox 20 may be coupled to the lower part of the gearbox 20, thereby ensuring the ease of installation of the gear device in the gearbox 20. When the rotor is installed in the lower part of the gearbox 20, the pinion gear 30 may be positioned inside the gearbox 20, and the bearing 10 coupled to the shaft 50 may be positioned in the hole formed in the gearbox 20 so that the shaft 50 can pass through the hole. Referring to FIG. 1B, the pin slot 21 is formed at the lower part of the gearbox 20. The pin slot 21 is a groove formed adjacent to the hole in which the bearing 10 is placed. Therefore, when the bearing 10 is placed in the hole formed in the gearbox 20, the rotation preventing pin 13 protruding from the bearing 10 may be placed in the pin slot 21. After the rotor is installed in the lower part of the gearbox 20 as described above, the upper part of the gearbox 20 and the lower part of the gearbox 20 may be coupled to each other, thereby preventing the rotation preventing pin 13 from moving between the upper and lower parts of the gearbox 20.

The angle of the load applied to the bearing 10 is determined by the design specifications of the bearing 10. Therefore, as the turbo device is continuously driven, the load may be concentrated at a specific position on the bearing 10, thereby deteriorating the durability of the bearing 10. In particular, if the bearing 10 is a tilting pad bearing, a pad on which the load is concentrated may operate abnormally.

The above problems can be solved by removing the installed rotation preventing pin 13 from an initial position and reinstalling the rotation preventing pin 13 at a new position different from the initial position. When the position of the rotation preventing pin 13 is changed, the angle of the load applied to the bearing 10 is not changed, but the angle at which the bearing 10 is mounted in the gearbox 20 is changed. Therefore, the load may be concentrated at a new position on an inner circumferential surface of the bearing 10.

FIG. 2 is a perspective view of a bearing 10 of the related art having a pin hole 12 to which a rotation preventing pin 13 is coupled by interference fit.

In the bearing 10 of the related art, only one pin hole 12 is formed along an outer circumferential surface of a housing 11, and the rotation preventing pin 13 is coupled to the pin hole 12 by the interference fit. In particular, shrink fitting (or thermal insert) is usually used. That is, an end of the rotation preventing pin 13 is inserted into the pin hole 12 by heating the pin hole 12 or the rotation preventing pin 13 to a high temperature. Then, as the pin hole 12 and the rotation preventing pin 13 cool, the pin hole 12 shrinks, thereby ensuring the tight coupling of the two elements.

When the pin hole 12 and the rotation preventing pin 13 are coupled by shrink fitting, the coupling force between the two elements is excellent. Therefore, the pin hole 12 and the rotation preventing pin 13 rotate integrally with each other, and there is no room for relative motion. However, it is impossible to detach the rotation preventing pin 13 coupled to the pin hole 12 by shrink fitting without damaging the housing 11 of the bearing 10 or the rotation preventing pin 13. Therefore, it is not possible to easily change the position of the rotation preventing pin 13 to change the position of supporting the load acting on the bearing 10.

SUMMARY

One or more exemplary embodiments provide a bearing which includes a plurality of pin holes on an outer circumferential surface of a housing to easily change the coupling position of a rotation preventing pin and thus change a load supporting position on an inner circumferential surface of the bearing.

However, aspects of the disclosure are not restricted to the one set forth herein. The above and other aspects of the disclosure will become more apparent to one of ordinary skill in the art to which the disclosure pertains by referencing the detailed description of the disclosure given below.

According to an aspect of an exemplary embodiment, there is provided a bearing of which a load supporting position capable of being changed, including: a cylindrical housing including a hollow inner circumferential surface; one or more support members provided in the housing and disposed along a circumferential direction of the inner circumferential surface; a plurality of pin holes provided along an outer circumferential surface of the housing; and a rotation preventing pin coupled to a first pin hole of the plurality of pin holes and configured to prevent rotation of the housing.

An inner circumferential surface of each of the plurality of pin holes may include hole threads.

An outer surface of the rotation preventing pin may include pin threads corresponding to the hole threads so that the rotation preventing pin can be coupled to the first pin hole of the plurality of pin holes.

The load supporting position is changed by removing the rotation preventing pin coupled to the first pin hole of the plurality of pin holes and then coupling the rotation preventing pin to a second pin hole of the plurality of pin holes.

The plurality of pin holes are formed at a constant interval.

The one or more support members may include tilting pads.

According to an aspect of an exemplary embodiment, there is provided a bearing capable of changing a load supporting position, the bearing including: a housing including: an inner circumferential surface configured to support a shaft; and an outer circumferential surface; one or more support members provided on the inner circumferential surface; a plurality of pin holes provided along the outer circumferential surface of the housing; and a rotation preventing pin coupled to a first pin hole of the plurality of pin holes and configured to prevent rotation of the housing by protruding from the housing and engaging with a fixing member.

BRIEF DESCRIPTION OF THE DRAWINGS

The above and/or other aspects of the disclosure will become apparent and more readily appreciated from the following description of exemplary embodiments, taken in conjunction with the accompanying drawings in which.

DETAILED DESCRIPTION

Figure 1A:
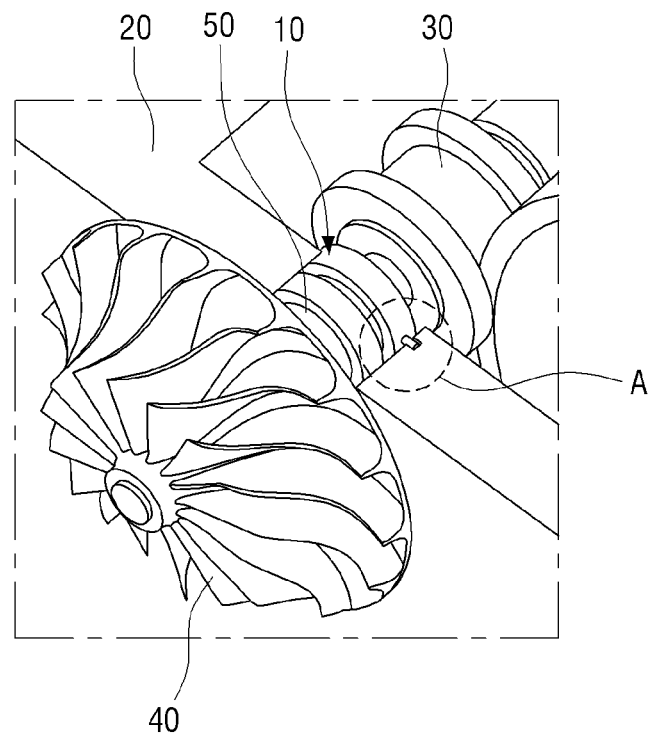
FIG. 1A is a perspective view illustrating a state where a rotor having a conventional bearing is mounted in a gearbox in the related art.
Figure 1B:
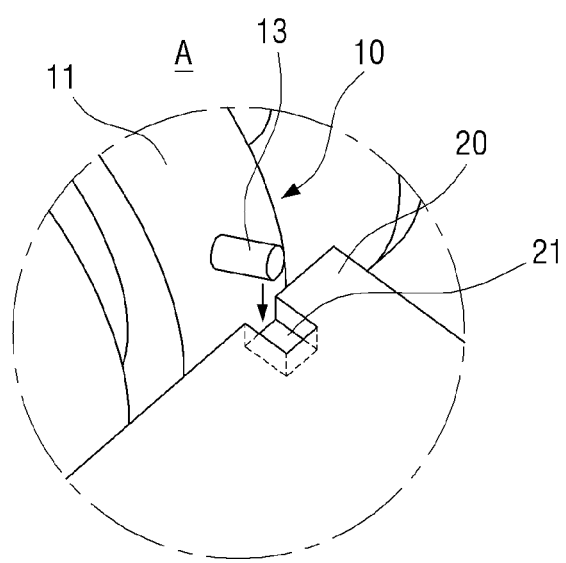
FIG. 1B is an enlarged view of a pin slot in which a rotation preventing pin is placed in the related art.
Figure 2:
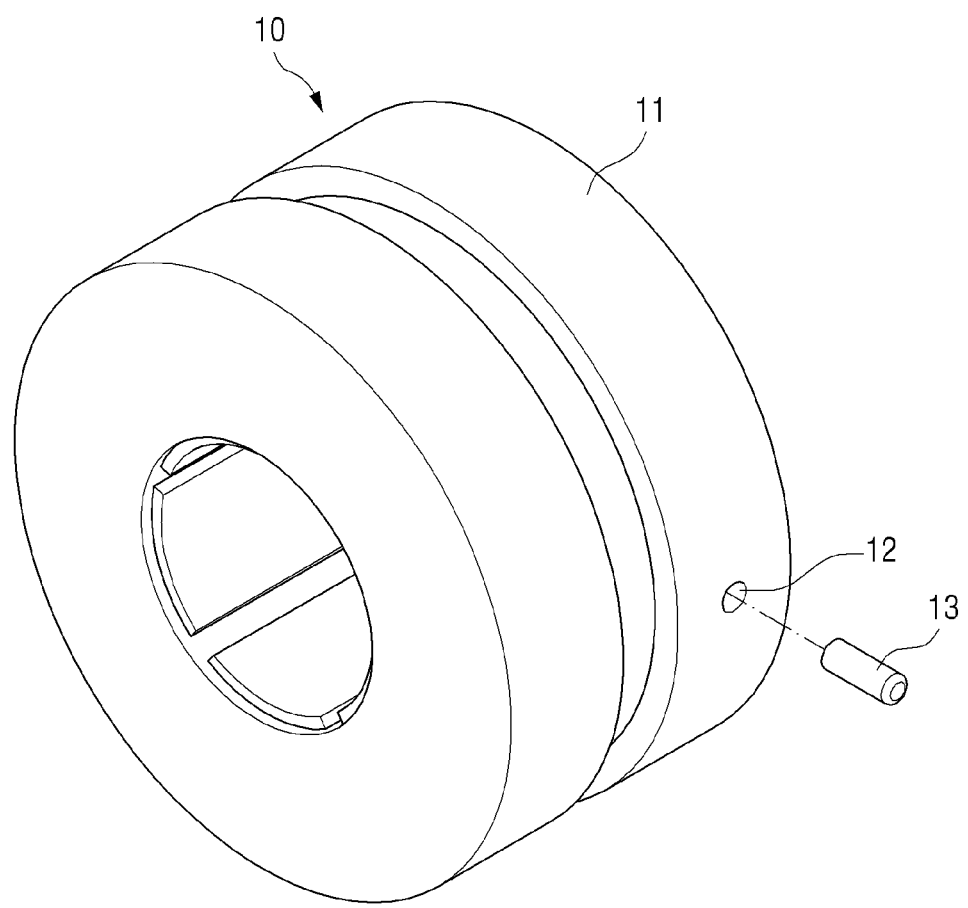
FIG. 2 is a perspective view of a bearing of the related art having a pin hole to which a rotation preventing pin is coupled by interference fit.

Advantages and features of the disclosure and methods of accomplishing the same may be understood more readily by reference to the following detailed description of exemplary embodiments and the accompanying drawings. The disclosure may, however, be embodied in many different forms and should not be construed as being limited to the exemplary embodiments set forth herein. Rather, these exemplary embodiments are provided so that the disclosure will be thorough and complete and will fully convey the concept of the invention to those skilled in the art, and the disclosure will only be defined by the appended claims. Like reference numerals refer to like elements throughout the specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated elements, but do not preclude the presence or addition of one or more other elements.

Hereinafter, exemplary embodiments of the disclosure will be described in detail with reference to the attached drawings.

Bearings may be classified into sliding bearings and rolling bearings according to a contact method and may be classified into radial bearings, thrust bearings and taper bearings according to a load direction. A journal refers to a part of a shaft in contact with a bearing, and a journal bearing refers to a bearing that supports the journal.

According to classification based on the contact method, a rolling bearing is a bearing that includes a rolling element such as a ball or a roller between a journal and the bearing and supports the load of a shaft using the pressure of contact with the rolling element. On the other hand, a sliding bearing is a bearing that does not include a rolling element between a journal and the bearing and supports the load using the pressure of a fluid or the like. The sliding bearing may support the load of the shaft using the pressure of an oil film by injecting lubricating oil as an intermediate medium or may support the load of the shaft using a magnetic force. Here, the sliding bearing using the lubricating oil is called a hydrodynamic journal bearing.

One type of hydrodynamic journal bearing is a tilting pad bearing. The tilting pad bearing is a bearing that includes a plurality of prefabricated pads. When the tilting pad bearing is operated, oil is injected onto a pad surface to form a thin and compressed film. The load of a shaft is supported by the formed oil film, and the pads are slightly tilted according to the load applied to the oil film. The tilt of the pads changes with the load applied to the bearing and the speed of the shaft. In the tilting pad bearing, the pads move based on the rotation of the shaft and the pressure gradient of the oil film, thereby preventing the vibration of the bearing. Therefore, the tilting pad bearing can be used in large turbo devices in which the rotor speed is high and bearings are subjected to large loads. In particular, because the tilting pad bearing improves the stability of the shaft, the tilting pad bearing may be mainly used in large turbines in which the bearing load of shaft alignment varies greatly.

According to classification based on the load direction, a radial bearing is a bearing that supports a radial load in a direction perpendicular to an axial direction of the shaft (i.e., a radial direction of the shaft), a thrust bearing is a bearing that supports an axial load applied in the axial direction, and a taper bearing is a bearing that simultaneously supports the loads in the axial direction and the radial direction.

A bearing including threaded pin holes according to the disclosure is applicable to all types of bearings described above. In FIGS. 3 through 7, tilting pad bearings are illustrated according to an exemplary embodiment.

Figure 3:
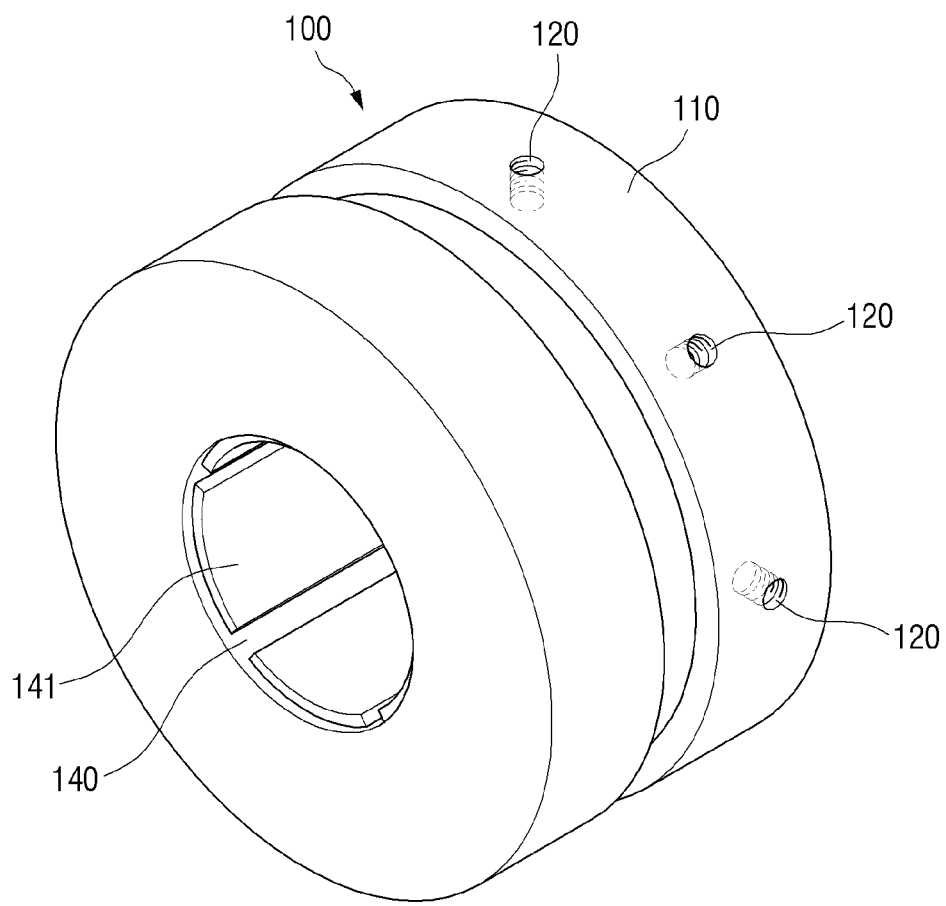
FIG. 3 is a perspective view of a bearing including a plurality of pin holes according to an exemplary embodiment.
Figure 4A:
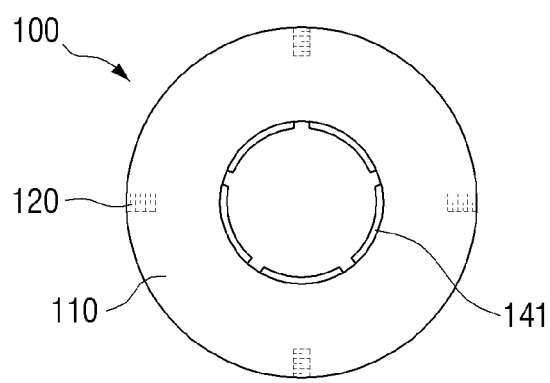
FIGS. 4A-4C are front views of bearings each including a plurality of pin holes formed at a different interval according to various exemplary embodiments.
Figure 4B:
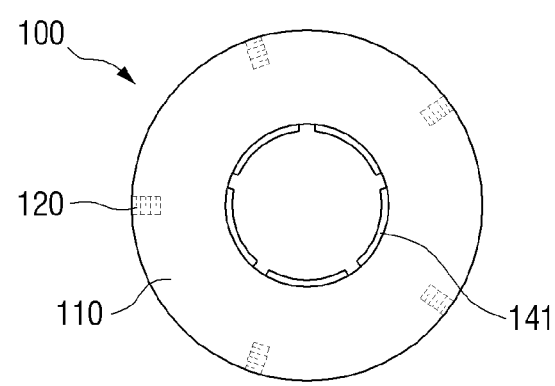
Figure 4C:
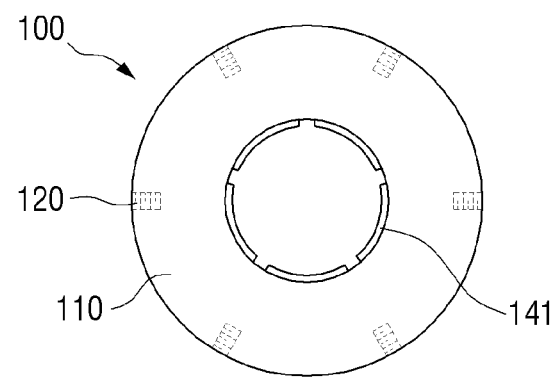
Figure 5:
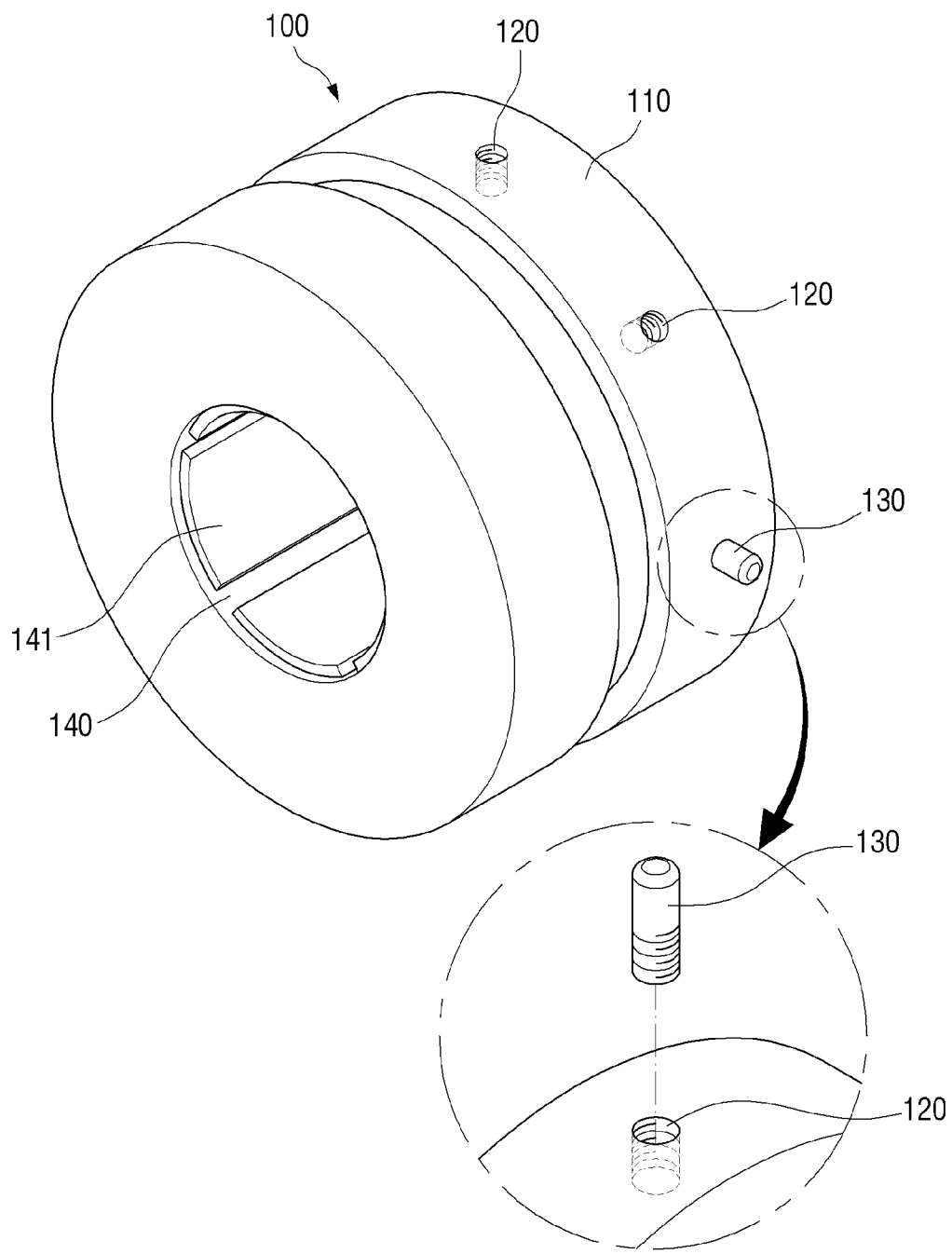
FIG. 5 is a perspective view of a bearing in which a rotation preventing pin is coupled to any one of a plurality of pin holes according to an exemplary embodiment.

FIG. 3 is a perspective view of a bearing 100 including a plurality of pin holes 120 formed at a constant interval of 45 degrees according to an exemplary embodiment. FIGS. 4A-4C are front views of bearings 100 each including a plurality of pin holes 120 formed at a different constant interval according to another exemplary embodiments. Specifically, FIG. 4A illustrates a bearing 100 including pin holes 120 formed at intervals of 90 degrees, FIG. 4B illustrates a bearing 100 including pin holes 120 formed at intervals of 72 degrees, and FIG. 4C illustrates a bearing 100 including pin holes 120 formed at intervals of 60 degrees. FIG. 5 is a perspective view of a bearing 100 in which a rotation preventing pin 130 is coupled to any one of a plurality of pin holes 120 according to an exemplary embodiment.

Referring to FIGS. 3 through 5, a bearing 100 where a load support position of the bearing 100 can be changed according to the disclosure may include a cylindrical housing 110 having a hollow inner circumferential surface 140 in the axial direction, one or more support members housed in the housing 110 and disposed along the inner circumferential surface 140, a plurality of pin holes 120 formed along an outer circumferential surface of the housing 110, and a rotation preventing pin 130 coupled to any one of the plurality of pin holes 120 and catching on a side of a fixing member to prevent the rotation of the housing 110.

The housing 110 of the bearing 100 may be made of a material having sufficient rigidity to support the load of a shaft rotating at high speed. In particular, the housing 110 of the bearing 100 may be made of metal. The housing 110 is formed in a cylindrical shape having a hollow inner circumferential surface so that the shaft can pass through the housing 110. The housing 110 may be formed as a single body or may be divided into an upper part and a lower part to be assembled with a shaft provided therebetween. If the housing 110 is divided into the upper part and the lower part, the bearing 100 can be replaced by separating the housing 110 without disassembling a rotor. Therefore, when the bearing 100 operates abnormally, it can be easily replaced.

In the bearing 100, one or more support members may be disposed inside the housing 110 along the inner circumferential surface 140 of the housing 110. The housing 110 may include the hollow inner circumferential surface 140 so that the shaft can pass through the bearing 100 to be supported by the bearing 100. The support members disposed on the inner circumferential surface 140 may support the shaft by contacting or facing the shaft. The support members may be formed as balls, rollers, needles, tilting pads, or lubricated friction surfaces depending on the type of the bearing 100.

The bearing 100 may include the plurality of pin holes 120 which are formed along the outer circumferential surface of the housing 110 and to which the rotation preventing pin 130 is coupled. Two or more pin holes 120 may be formed so that a coupling position of the rotation preventing pin 130 can be changed to change a load supporting position on the inner circumferential surface 140 of the bearing 100.

The plurality of pin holes 120 may be formed on the outer circumferential surface of the bearing 100 at a constant interval or at arbitrary intervals according to the design specifications or operating environment of the bearing 100. When the plurality of pin holes 120 are formed at the constant interval, the plurality of pin holes 120 may be formed at intervals of 45 degrees, 60 degrees, 70 degrees or 90 degrees as shown in the exemplary embodiments of FIGS. 3 and 4A-4C. However, the plurality of pin holes 120 may also be formed at various intervals of 15 degrees, 30 degrees, and 120 degrees.

Because the bearing 100 includes a plurality of pin holes 120 formed along the outer circumferential surface of the bearing 100, a process for forming an additional pin hole 120 can be omitted when the position of the rotation preventing pin 130 to be described later needs to be changed. Therefore, the convenience of operation and a reduction in the repair cost of the bearing 100 can be expected.

The bearing 100 may include the rotation preventing pin 130 which is coupled to any one of the pin holes 120, and the rotation preventing pin 130 may catch on a side of the fixing member to prevent the rotation of the bearing 100 including the housing 110. The fixing member may be a part (e.g., a gearbox) in which the bearing 100 is fixed and installed in a turbo device. The rotation preventing pin 130 coupled to the bearing 100 prevents the rotation of the bearing 100 by resting on a pin slot formed in the gearbox and fixes the position of the bearing 100 in the gearbox. Therefore, the rotation preventing pin 130 may be made of a material having sufficient rigidity to resist a rotational force transmitted from the shaft to the bearing 100. In particular, the rotation preventing pin 130 may be made of metal. The coupling relationship between the pin holes 120 and the rotation preventing pin 130 will now be described.

According to an exemplary embodiment, threads may be formed on inner circumferential surfaces of the pin holes 120. In addition, corresponding threads may be formed on an outer circumferential surface of the rotation preventing pin 130 in an area corresponding to the pin holes 120 to which the rotation preventing pin 130 is to be coupled. Therefore, the rotation preventing pin 130 and any one of the pin holes 120 can be screwed to each other.

Specifically, a threaded area of the outer circumferential surface of the rotation preventing pin 130 is a lower end of the rotation preventing pin 130, in particular, a part of the rotation preventing pin 130 which is to be coupled to a pin hole 120. The pin hole 120 and the rotation preventing pin 130 may be coupled to each other with the pin hole 120 serving as a female screw and the rotation preventing pin 130 serving as a male screw.

The threaded area of the rotation preventing pin 130 may be formed in a cylindrical shape so that it can be screwed to a pin hole 120. However, an unthreaded area of the rotation preventing pin 130 can be formed not only in a cylindrical shape but also in various shapes such as a square prism, a pentagonal prism, and a hexagonal prism.

In the bearing 100, the rotation preventing pin 130 can be easily installed in a pin hole 120 by the engagement of the threads formed at the lower end of the rotation preventing pin 130 and as well as formed inside the pin hole 120. In addition, the rotation preventing pin 130 can be easily removed from the pin hole 120 by unscrewing of the rotation preventing pin 130 from the pin hole 120. Because the bearing 100 secures the ease of coupling and decoupling as described above, the installation position of the rotation preventing pin 130 can be easily changed. Accordingly, the position at which the load is applied to the bearing 100 can be easily changed. This will be described later.

The method of coupling a pin hole 120 and the rotation preventing pin 130 using their corresponding threads has been described above. However, the pin hole 120 and the rotation preventing pin 130 can be coupled to each other using any method as long as they can be easily coupled and decoupled, in particular, as long as the bearing 100 including the rotation preventing pin 130 is not damaged in the decoupling process.

Figure 6:
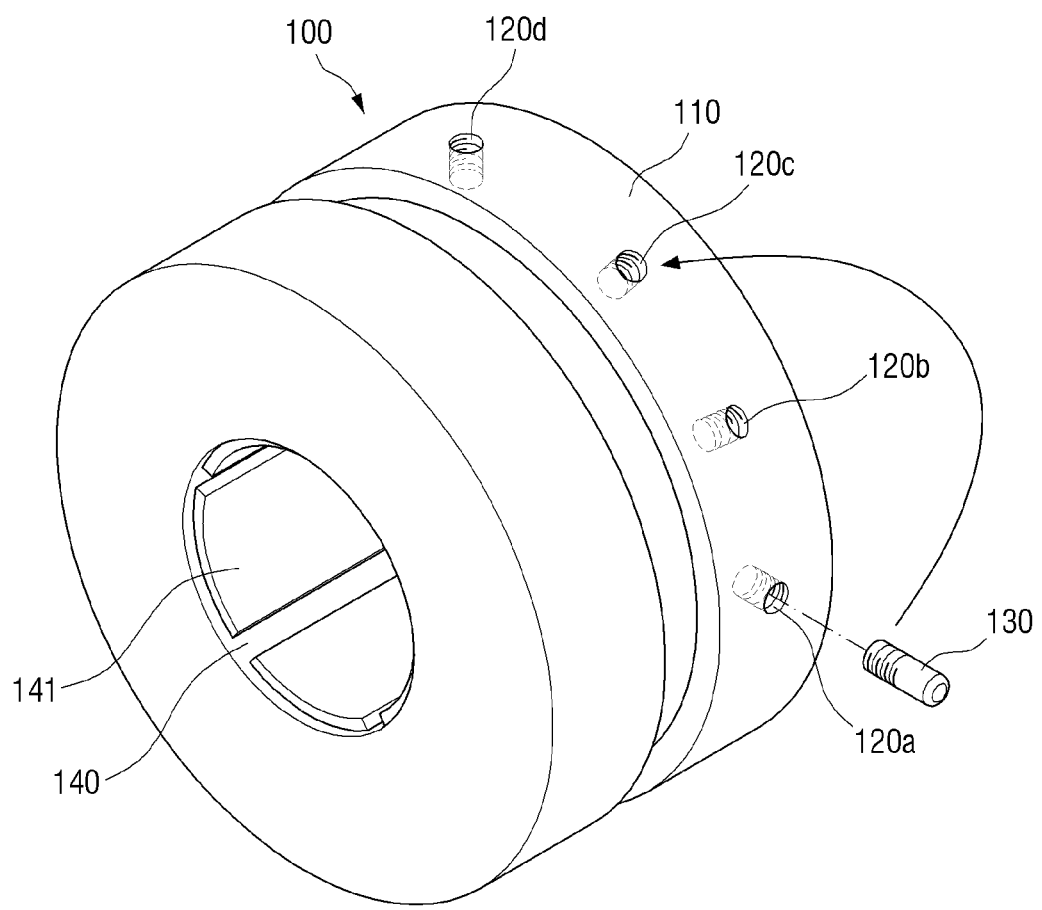
FIG. 6 illustrates a process of changing the position of an installed rotation preventing pin according to an exemplary embodiment.
Figure 7A:
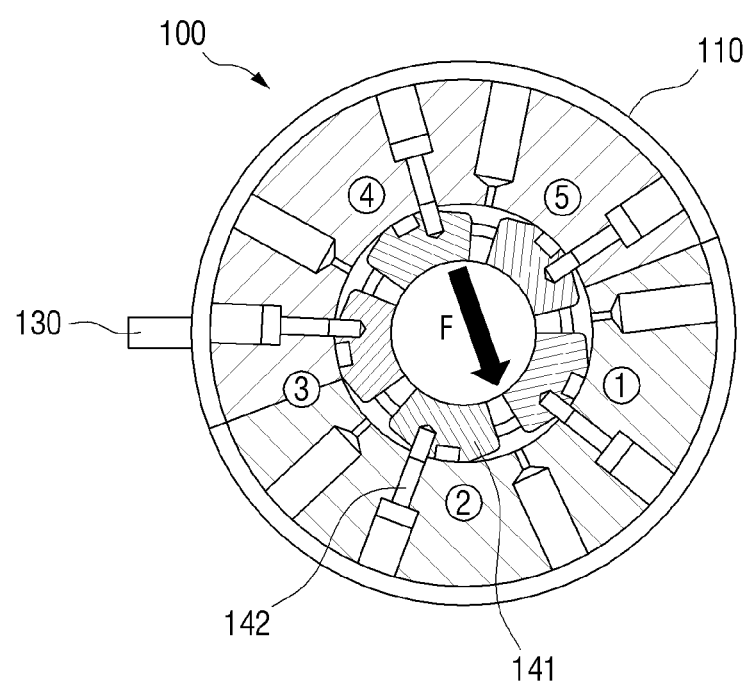
FIGS. 7A-7B illustrate a change in a load supporting position on an inner circumferential surface of a bearing when the position of an installed rotation preventing pin is changed according to exemplary embodiments.
Figure 7B:
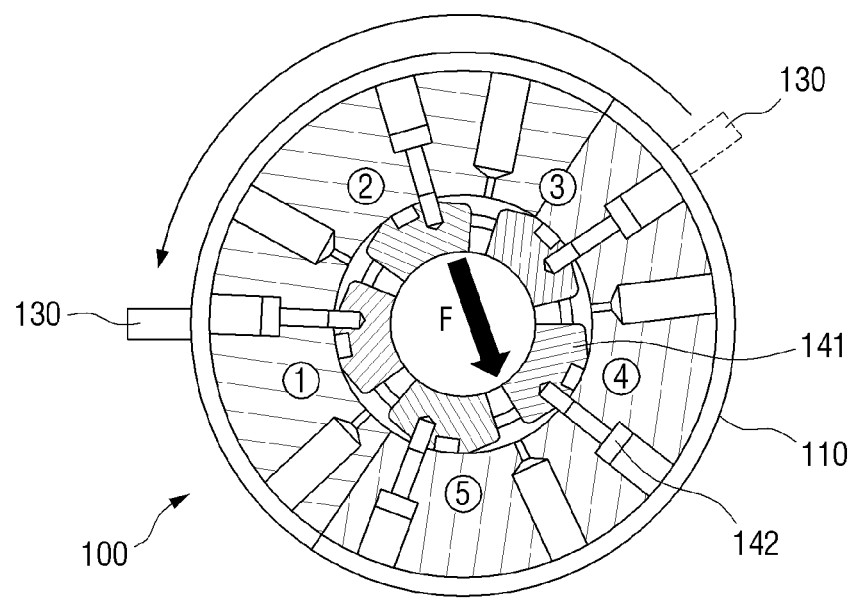

FIG. 6 illustrates a process of changing the position of a rotation preventing pin 130 installed on a bearing 100 having a plurality of pin holes 120 formed at intervals of 30 degrees according to an exemplary embodiment. FIGS. 7A and 7B illustrate a change in a load supporting point when the position of the installed rotation preventing pin 130 is changed according to exemplary embodiments.

Referring to FIGS. 6 and 7A-7B, the bearing 100 may be rotated by decoupling the rotation preventing pin 130 from a current pin hole 120 and then coupling the rotation preventing pin 130 to another pin hole 120. Specifically, because the rotation preventing pin 130 is placed in a pin slot, the position of the rotation preventing pin 130 on a gearbox is fixed. Accordingly, the bearing 100 mounted on the gearbox may be rotated by changing the position of the rotation preventing pin 130 installed on an outer circumferential surface of the bearing 100.

In the case of FIG. 6, the rotation preventing pin 130 is removed from an initial pin hole 120a and then coupled to a new pin hole 120c located at a position 60 degrees counterclockwise from the current pin hole 120a. Therefore, the bearing 100 is rotated clockwise by 60 degrees on the gearbox. In the case of FIGS. 7A and 7B, the rotation preventing pin 130 installed on an outer circumferential surface corresponding to a third tilting pad (FIG. 7A) is removed and then installed at a position 144 degrees counterclockwise from the third tilting pad, that is, on an outer circumferential surface corresponding to a first tilting pad (FIG. 7B). Accordingly, the bearing 100 is rotated clockwise by 144 degrees on the gearbox. A change in the load supporting position due to the rotation of the bearing 100 will now be described in detail.

The tilting pad bearing 100 includes tilting pads 141 fixed to an inner circumferential surface 140 of a housing 110 by pivot screws 142. The tilting pads 141 are slightly tilted according to the rotation of a shaft passing through a hollow of the housing 110, thereby attenuating the vibration of the shaft transmitted to the bearing 100. In the tilting pad bearing 100, lubricating oil is injected into a gap between the shaft and the tilting pads 141 to form an oil film, and the shaft is supported by the oil film. The shaft is deflected in a specific direction from a center of the hollow of the bearing 100. Therefore, a pressure gradient is formed in the oil film. The pressure gradient causes a strong load to be concentrated at a specific position (hereinafter, referred to as a load supporting point) on an inner circumferential surface of the bearing 100. Therefore, a tilting pad 141 near the load supporting point should support a larger load than the other tilting pads 141. In addition, since the oil film formed between the shaft and the tilting pads 141 is thinner near the load supporting point than at other places, a temperature rise due to the viscous heat generation of the lubricating oil is greater near the load supporting point.

As described above, because a tilting pad 141 that supports the load of the bearing 100 has to withstand a large force and a high temperature, its durability may be reduced faster than the other tilting pads 141. An angle at which the load acts during the operation of the tilting pad bearing 100 is a value determined at the design stage by the rotation speed of a rotor, the size and weight of a gear, the radius of the shaft, etc. Therefore, in the case of a conventional bearing 100, when a defect occurs in a tilting pad 141 near the load supporting point, the bearing 100 itself has to be replaced.

However, in the case of the bearing 100, even if a defect occurs in a specific tilting pad 141, the bearing 100 can be rotated by coupling the rotation preventing pin 130 to another pin hole 120. Therefore, the load supporting point can be induced to be formed at another position on the inner circumferential surface of the bearing 100. This can reduce the cost of designing and manufacturing a new bearing 100.

Further, it is possible to prevent a specific tilting pad 141 from supporting the load for a long period of time and improve the durability of the tilting pad bearing 100 by periodically changing the installation position of the rotation preventing pin 130.

For example, referring to FIGS. 7A and 7B, in the tilting pad bearing 100 in which a load F acts between first and second tilting pads, when the first or second tilting pad is worn or thermally damaged (FIG. 7A), the position at which the load F acts on the inner circumferential surface of the bearing 100 can be changed by rotating the bearing 100 by changing the coupling position of the rotation preventing pin 130. If the rotation preventing pin 130 is installed at a position 144 degrees counterclockwise from a current position, that is, if the bearing 100 is rotated clockwise by 144 degrees, the load F may act between fourth and fifth tilting pads (FIG. 7B), thus enabling the continuous use of the bearing 100 despite the damage of the first or second tilting pad.

According to an exemplary embodiment, a load supporting method of the tilting pad bearing 100 may be changed by changing the installation position of the rotation preventing pin 130. The load supporting method of the tilting pad bearing 100 may be classified into a load-between-pad (LBP) method in which a load is supported between tilting pads 141 and a load-on-pad (LOP) method in which a specific tilting pad 141 supports a load. The load supporting point is formed between two tilting pads 141 according to the LBP method and is formed on an upper surface of one tilting pad 141 according to the LOP method. The bearing 100 may support the load by changing the LBP method to the LOP method or changing the LOP method to the LBP method by coupling the rotation preventing pin 130 to another pin hole 120 according to, e.g., a change in the operating environment.

As described above, in the bearing 100, the position at which the load is concentrated on the inner circumferential surface of the bearing 100 is changed by changing the position of the rotation preventing pin 130 coupled to any one of the pin holes 120 formed in the outer circumferential surface. Therefore, the bearing 100 can be prevented from being seriously damaged. Further, even when a part of the bearing 100 is slightly damaged, the bearing 100 can be operated normally without the replacement of the bearing 100. This is because, for example, when a specific tilting pad 141 in a tilting pad bearing 100 operates abnormally, the position of the rotation preventing pin 130 can be changed so that the load is concentrated on a tilting pad 141 operating normally. Since the bearing 100 secures the ease of changing the position of the rotation preventing pin 130 as described above, the durability of the bearing 100 can be improved, and the operating life of the bearing 100 can be extended.

Exemplary embodiments provide at least one of the following advantages.

A bearing according to the present disclosure includes a plurality of pin holes formed in an outer circumferential surface of a housing. Therefore, it is possible to change the installation position of a rotation preventing pin and thus change a load supporting position on an inner circumferential surface of the bearing.

In addition, in the bearing according to the present disclosure, the rotation preventing pin can be easily installed or removed through screwing of the rotation preventing pin and a pin hole.

However, the effects of the exemplary embodiments are not restricted to the one set forth herein. The above and other effects of the exemplary embodiments will become more apparent to one of daily skill in the art to which the exemplary embodiments pertain by referencing the claims.

While exemplary embodiments have been described above, it will be understood by those of ordinary skill in the art that various changes in form and details may be made therein without departing from the spirit and scope of the disclosure as defined by the following claim.

What is claimed is:

1. A bearing of which a load supporting position is capable of being changed, the bearing comprising:
    a cylindrical housing comprising a hollow inner circumferential surface;
    one or more support members provided in the housing and disposed along a circumferential direction of the inner circumferential surface;
    a plurality of pin holes provided along an outer circumferential surface of the housing;
    a rotation preventing pin coupled to a first pin hole of the plurality of pin holes and configured to prevent rotation of the housing;
    the hollow inner circumferential surface and the outer circumferential surface are concentric;
    an inner circumferential surface of each of the plurality of pin holes comprises hole threads;
    an outer surface of the rotation preventing pin comprises pin threads corresponding to the hole threads so that the rotation preventing pin can be coupled to the first pin hole of the plurality of pin holes; and
    a portion of the outer surface of the rotation preventing pin that is configured to engage with a fixing member is unthreaded.

2. The bearing of claim 1, wherein an inner circumferential surface of each of the plurality of pin holes comprises hole threads.

3. The bearing of claim 2, wherein an outer surface of the rotation preventing pin comprises pin threads corresponding to the hole threads so that the rotation preventing pin can be coupled to the first pin hole of the plurality of pin holes.

4. The bearing of claim 1, wherein the rotation preventing pin is configured to be removed from the first pin hole of the plurality of pin holes and then coupled to a second pin hole of the plurality of pin holes such as to change the load supporting position.

5. The bearing of claim 1, wherein the plurality of pin holes are formed at a constant interval.

6. The bearing of claim 1, wherein the one or more support members comprise tilting pads.

7. A bearing capable of changing a load supporting position, the bearing comprising:
    a housing comprising:
        an inner circumferential surface configured to support a shaft; and
        an outer circumferential surface;
    one or more support members provided on the inner circumferential surface;
    a plurality of pin holes provided along the outer circumferential surface of the housing;
    a rotation preventing pin coupled to a first pin hole of the plurality of pin holes and configured to prevent rotation of the housing by protruding from the housing and engaging with a fixing member,
    the inner circumferential surface and the outer circumferential surface are concentric;
    an inner surface of each of the plurality of pin holes comprises hole threads;
    an outer surface of the rotation preventing pin comprises pin threads corresponding to the hole threads so that the rotation preventing pin can be coupled to the first pin hole of the plurality of pin holes; and
    a portion of the outer surface of the rotation preventing pin that is configured to engage with the fixing member is unthreaded.

8. The bearing of claim 7, wherein an inner surface of each of the plurality of pin holes comprises hole threads.

9. The bearing of claim 8, wherein an outer surface of the rotation preventing pin comprises pin threads corresponding to the hole threads so that the rotation preventing pin can be coupled to the first pin hole of the plurality of pin holes.

10. The bearing of claim 7, wherein the rotation preventing pin is configured to be removed from the first pin hole of the plurality of pin holes and then coupled to a second pin hole of the plurality of pin holes such as to change the load supporting position.

11. The bearing of claim 7, wherein the plurality of pin holes are formed at a constant interval.

12. The bearing of claim 7, wherein the one or more support members comprise tilting pads.

* * * * *